(12) United States Patent
Blok et al.

(10) Patent No.: US 6,988,523 B2
(45) Date of Patent: Jan. 24, 2006

(54) TREAD RUBBER FOR HIGH TRACTION TIRES

(75) Inventors: Edward John Blok, Wadsworth, OH (US); Paul Harry Sandstrom, Tallmadge, OH (US); Cheryl Ann Losey, Kent, OH (US); David John Zanzig, Uniontown, OH (US); John Joseph Andre Verthe, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 224 days.

(21) Appl. No.: 10/681,516

(22) Filed: Oct. 8, 2003

(65) Prior Publication Data

US 2004/0069388 A1     Apr. 15, 2004

Related U.S. Application Data

(62) Division of application No. 09/616,271, filed on Jul. 14, 2000, now Pat. No. 6,670,416.

(60) Provisional application No. 60/149,592, filed on Aug. 18, 1999.

(51) Int. Cl.
    *B60C 1/00*           (2006.01)
    *B60C 9/02*           (2006.01)

(52) U.S. Cl. ........................ 152/564; 524/495; 524/496

(58) Field of Classification Search ................ 524/492, 524/493, 494, 495, 496, 484; 152/564
See application file for complete search history.

(56) References Cited

U.S. PATENT DOCUMENTS

| | | | | |
|---|---|---|---|---|
| 5,047,483 A | * | 9/1991 | Halasa et al. | ................ 525/237 |
| 5,132,357 A | | 7/1992 | Endter et al. | ................ 524/496 |
| 5,504,140 A | | 4/1996 | Zanzig et al. | ................ 524/526 |
| 5,534,592 A | | 7/1996 | Halasa et al. | ................ 525/236 |

* cited by examiner

*Primary Examiner*—James J. Seidleck
*Assistant Examiner*—U K. Rajguru
(74) *Attorney, Agent, or Firm*—Henry C. Young, Jr.

(57) ABSTRACT

This invention discloses a pneumatic tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; wherein the tread is comprised of (a) about 60 phr to about 90 phr of a cis-1,4-polybutadiene rubber, wherein the cis-1,4-polybutadiene rubber has a glass transition temperature which is within the range of about −104° C. to about −80° C., (b) about 10 phr to about 40 phr of at least one additional rubbery polymer selected from the group consisting of polyisoprene rubber, polybutadiene rubber, isoprene-butadiene rubber, and styrene-isoprene-butadiene rubber, wherein the additional rubbery polymer has a glass transition temperature which is within the range of about −30° C. to about −10° C., and (c) about 20 phr to about 60 phr of carbon black, wherein the carbon black has a dibutylphthalate absorption value of at least 140 cm³/100 grams and wherein the carbon black has a cetyl trimethyl ammonium bromide adsorption area which is within the range of about 60 to about 90.

17 Claims, No Drawings

TREAD RUBBER FOR HIGH TRACTION TIRES

This is a divisional of U.S. patent application Ser. No. 09/616,271, filed on Jul. 14, 2000 now U.S. Pat. No. 6,670,416, which claims the benefit of U.S. Provisional Patent Application Ser. No. 60/149,592, filed on Aug. 18, 1999.

BACKGROUND OF THE INVENTION

It is highly desirable for tires to provide good treadwear, low rolling resistance and good traction on wet and dry surfaces. In order to reduce the rolling resistance of a tire, rubbers having high rebound can be utilized in making the tire tread. Tires made with such rubbers undergo less energy loss during rolling. The traditional problem associated with this approach is that wet traction and wet skid resistance are compromised. This is because good rolling resistance which favors low energy loss and good traction characteristics which favor high energy loss are viscoelastically inconsistent properties.

In order to balance these two viscoelastically inconsistent properties, mixtures of various types of synthetic and natural rubber are normally utilized in tire treads. For instance, various mixtures of styrene-butadiene rubber and polybutadiene rubber are commonly used in tire tread compounds for automobile tire treads. Blends of rubbers having a low glass transition temperature with rubbers having a high glass transition temperature offer significant advantages in treadwear and traction characteristics over low rolling resistance tread compounds made with blends of rubbers having intermediate glass transition temperatures. The major disadvantage associated with blends of rubbers having low and high glass transition temperatures is that they exhibit poor processability. Blends of high molecular weight isoprene-butadiene rubber with natural rubber can be used in formulations that offer ultra low rolling resistance to improve processability. However, such blends of rubbers having intermediate glass transition temperatures have an undesirable effect on treadwear and rolling resistance without significantly improving traction.

U.S. Pat. No. 4,843,120 discloses that tires having improved performance characteristics can be prepared by utilizing rubbery polymers having multiple glass transition temperatures as the tread rubber. These rubbery polymers having multiple glass transition temperatures exhibit a first glass transition temperature which is within the range of about $-110°$ C. to $-20°$ C. and exhibit a second glass transition temperature which is within the range of about $-50°$ C. to $0°$ C. According to U.S. Pat. No. 4,843,120, these polymers are made by polymerizing at least one conjugated diolefin monomer in a first reaction zone at a temperature and under conditions sufficient to produce a first polymeric segment having a glass transition temperature which is between $-110°$ C. and $-20°$ C. and subsequently continuing said polymerization in a second reaction zone at a temperature and under conditions sufficient to produce a second polymeric segment having a glass transition temperature which is between $-20°$ C. and $20°$ C. Such polymerizations are normally catalyzed with an organolithium catalyst and are normally carried out in an inert organic solvent.

U.S. Pat. No. 5,137,998 discloses a process for preparing a rubbery terpolymer of styrene, isoprene and butadiene having multiple glass transition temperatures and having an excellent combination of properties for use in making tire reads which comprises terpolymerizing styrene, isoprene and 1,3-butadiene in an organic solvent at a temperature of no more than about $40°$ C. in the presence of (a) at least one member selected from the group consisting of tripiperidino phosphine oxide and alkali metal alkoxides and (b) an organolithium compound.

U.S. Pat. No. 5,047,483 discloses a pneumatic tire having an outer circumferential tread where said tread is a sulfur-cured rubber composition comprised of, based on 100 parts by weight rubber (phr), (A) about 10 to about 90 parts by weight of a styrene-isoprene-butadiene terpolymer rubber (SIBR) and (B) about 70 to about 30 weight percent of cis 1,4-polyisoprene rubber or cis 1,4-polybutadiene rubber, wherein said SIBR rubber is comprised of (1) about 10 to about 35 weight percent bound styrene, (2) about 30 to about 50 weight percent bound isoprene and (3) about 30 to about 40 weight percent bound butadiene and is characterized by having a single glass transition temperature (Tg) which is in the range of about $-10°$ C. to about $-40°$ C. and, further, the said bound butadiene structure contains about 30 to about 40 percent 1,2-vinyl units, the said bound isoprene structure contains about 10 to about 30 percent 3,4-units and the sum of the percent 1,2-vinyl units of the bound butadiene and the percent 3,4-units of the bound isoprene is in the range of about 40 to about 70 percent.

U.S. Pat. No. 5,272,220 discloses a styrene-isoprene-butadiene rubber which is particularly valuable for use in making truck tire treads which exhibit improved rolling resistance and tread wear characteristics, said rubber being comprised of repeat units which are derived from about weight percent to about 20 weight percent styrene, from about 7 weight percent to about 35 weight percent isoprene and from about 55 weight percent to about 88 weight percent 1,3-butadiene, wherein the repeat units derived from styrene, isoprene and 1,3-butadiene are in essentially random order, wherein from about 25 percent to about 40 percent of the repeat units derived from the 1,3-butadiene are of the cis-microstructure, wherein from about 40 percent to about 60 percent of the repeat units derived from the 1,3-butadiene are of the trans-microstructure, wherein from about 5 percent to about 25 percent of the repeat units derived from the 1,3-butadiene are of the vinyl-microstructure, wherein from about 75 percent to about 90 percent of the repeat units derived from the isoprene are of the 1,4-microstructure, wherein from about 10 percent to about 25 percent of the repeat units derived from the isoprene are of the 3,4-microstructure, wherein the rubber has a glass transition temperature which is within the range of about $-90°$ C. to about $-70°$ C., wherein the rubber has a number average molecular weight which is within the range of about 150,000 to about 400,000, wherein the rubber has a weight average molecular weight of about 300,000 to about 800,000 and wherein the rubber has an inhomogeneity which is within the range of about 0.5 to about 1.5.

U.S. Pat. No. 5,405,927 discloses an isoprene-butadiene rubber which is reported to be particularly valuable for use in making truck tire treads, said rubber being comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3 percent to about 10 percent of the repeat units in said rubber are 1,2-polybutadiene units, wherein from about 50 percent to about 70 percent of the repeat units in said rubber are 1,4-polybutadiene units, wherein from about 1 percent to about 4 percent of the repeat units in said rubber are 3,4-polyisoprene units, wherein from about percent to about 40 percent of the repeat units in the polymer are 1,4-polyisoprene units, wherein the rubber has a glass transition temperature which is within the range of about −90° C. to about −75° C. and wherein the rubber has a Mooney viscosity which is within the range of about 55 to about 140. U.S. Pat. No. 5,405,927 specifically discloses blends of this isoprene-butadiene rubber with natural rubber or 3,4-polyisoprene.

SUMMARY OF THE INVENTION

It has been unexpectedly found that the processability of ultra low rolling resistance tire tread compounds can be significantly improved by incorporating a specific type of highly structured carbon black into certain blends of high cis-1,4-polybutadiene rubber having a low glass transition temperature with a polybutadiene rubber, polyisoprene rubber or a styrene-isoprene-butadiene rubber having a high glass transition temperature. The carbon black used in the tire tread rubber formulations of this invention has a DBP absorption value of at least 140 cm³/100 grams and a CTAB adsorption area which is within the range of about 60 to about 90.

The subject invention more specifically discloses a tire tread rubber composition which is comprised of (a) about 60 phr to about 90 phr of a high cis-1,4-polybutadiene rubber, wherein the high cis-1,4 -polybutadiene rubber has a glass transition temperature which is within the range of about −104° C. to about −80° C., (b) about 10 phr to about 40 phr of at least one additional rubbery polymer selected from the group consisting of polyisoprene rubber, polybutadiene rubber and styrene-isoprene-butadiene rubber, wherein the additional rubbery polymer has a glass transition temperature which is within the range of about −30° C. to about −10° C. isoprene-butadiene rubber and (c) about 20 phr to about 60 phr of carbon black, wherein the carbon black has a DBP absorption value of at least 140 cm³/100 grams and wherein the carbon black has a CTAB adsorption area which is within the range of about 60 to about 90.

The subject invention further discloses a pneumatic tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; wherein the tread is comprised of (a) about 60 phr to about 90 phr of a high cis-1,4-polybutadiene rubber, wherein the high cis-1,4-polybutadiene rubber has a glass transition temperature which is within the range of about −104° C. to about −80° C., (b) about 10 phr to about 40 phr of at least one additional rubbery polymer selected from the group consisting of polyisoprene rubber, polybutadiene rubber and styrene-isoprene-butadiene rubber, wherein the additional rubbery polymer has a glass transition temperature which is within the range of about −30° C. to about −10° C. isoprene-butadiene rubber and (c) about 20 phr to about 60 phr of carbon black, wherein the carbon black has a DBP absorption value of at least 140 cm³/100 grams and wherein the carbon black has a CTAB adsorption area which is within the range of about 60 to about 90.

DETAILED DESCRIPTION OF THE INVENTION

The tire tread rubber compounds of this invention will typically contain about 60 phr (parts per 100 parts by weight of rubber) to about 90 phr of the high cis-1,4-polybutadiene rubber and about 10 phr to about 40 phr of a rubbery polymer having a high glass transition temperature selected from the group consisting of polyisoprene rubber, polybutadiene rubber and styrene-isoprene-butadiene rubber, wherein the high Tg rubbery polymer has a glass transition temperature which is within the range of about −30° C. to about −10° C. It is highly desirable for the tire tread rubber compounds of this invention to be essentially void of rubbery polymers having a glass transition temperature which is within the range of about −70° C. to about −40° C. For instance, the tread rubber compounds of this invention should not contain any natural rubber because rubbery polymers having an intermediate glass transition temperature are detrimental to properties.

In most cases, the tire tread rubber compound will contain about 70 phr to about 90 phr of the high cis-1,4-polybutadiene rubber and about 10 phr to about 30 phr of a high Tg rubbery polymer selected from the group consisting of polyisoprene rubber, polybutadiene rubber and styrene-isoprene-butadiene rubber. The tire tread rubber compound will preferably contain about 80 phr to about 90 phr of the high cis-1,4-polybutadiene rubber and about 10 phr to about 20 phr of a high Tg rubbery polymer.

The tire tread compounds of this invention will typically contain from about 20 phr to about 60 phr of carbon black and will more typically contain from about 30 phr to about 55 phr of carbon black. The tire tread compound will preferably contain from 40 phr to 50 phr of carbon black. The tire tread compounds of this invention can also optionally contain up to 40 phr of silica.

The carbon black used in the blends of this invention will have a dibutylphthalate absorption value (DBP) of 140 cm³/100 grams to 200 cm³/100 grams. The carbon black will typically have a DBP of at least 150 cm³/100 grams and will preferably have a DBP of at least 160 cm³/100 grams. DBP is determined according to the procedure set forth in ASTM D2414. The carbon black will also have a cetyl trimethyl ammonium bromide adsorption area (CTAB) which is within the range of about 60 to about 90. The carbon black will preferably have a CTAB value which is within the range of about 70 to about 85. CTAB is determined by ASTM Test Procedure D3765-85.

The high cis-1,4-polybutadiene rubber having a low glass transition temperature that can be used in the tire tread rubber compounds of this invention can be synthesized by solution polymerization using the process described in U.S. Pat. No. 4,983,695 or U.S. Pat. No. 5,698,643. The teachings of U.S. Pat. No. 4,983,695 and U.S. Pat. No. 5,698,643 are incorporated herein by reference in their entirety. The high cis-1,4-polybutadiene rubber will typically have a glass transition temperature which is within the range of about −110° C. to about −80° C. and a cis content of at least 85 percent. The high cis-1,4-polybutadiene rubber will normally have a glass transition temperature which is within the range of about −105° C. to about −85° C. and a cis content of at least 90 percent. The high cis-1,4-polybutadiene rubber will more typically have a glass transition temperature which is within the range of about −105° C. to about −90° C. and a cis content of at least 95 percent.

The high cis-1,4-polybutadiene rubber will also normally have a Mooney 1+4 viscosity which is within the range of about 40 to about 60. Budene® 1208 cis-1,4-polybutadiene rubber has a cis microstructure content of about 98 percent, a Mooney 1+4 viscosity of 41–51 and a glass transition temperature of −104° C. Budene® 1208 rubber is commercially available from The Goodyear Tire & Rubber Company and is highly preferred for use in the tire tread formulations of this invention. For purposes of this patent application, polymer microstructure is determined by nuclear magnetic resonance spectrometry (NMR) and glass transition temperature (Tg) is determined by differential scanning calorimetry at a heating rate of 10° C. per minute.

The tread rubber formulations of this invention can be compounded utilizing conventional ingredients and standard techniques. For instance, the tire tread compounds of this invention will typically be blended with sulfur, fillers, accelerators, oils, waxes, scorch inhibiting agents and processing aids. In most cases, the rubber formulation will be compounded with sulfur and/or a sulfur containing compound, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Silica can be used in conjunction with carbon black to improve tear resistance and heat buildup. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the blend in amounts ranging from 0.25 to phr with amounts in the range of 1 to 5 phr being preferred. Processing oils will generally be included in the blend in amounts ranging from about 1 phr to about 100 phr with amounts ranging from about 2 phr to about 50 phr being preferred. It is normally most preferred for the tire tread compound to contain from about 2 to about 18 phr of processing oil. The tire tread rubber formulations of this invention will also normally contain from about 0.5 phr to about 10 phr of zinc oxide with it being preferred for the zinc oxide to be present at a level within the range of about 1 phr to about 5 phr. These blends can optionally contain from 0 to 10 phr of tackifier resins, 0 to 10 phr of reinforcing resins, 1 to 10 phr of fatty acids, 0 to 2.5 phr of peptizers and 0 to 1 phr of scorch inhibiting agents.

The silica that can optionally be utilized in the tread rubber compounds of this invention can be any of the common siliceous pigments used in rubber compounding applications, such as pyrogenic and precipitated siliceous pigments (silica), although precipitate silicas are preferred. Siliceous pigments are preferred; for instance, precipitated silicas such as those obtained by the acidification of a soluble silicate (sodium silicate).

Such silicas might be characterized, for example, by having a BET surface area, as measured using nitrogen gas, preferably in the range of about 40 to about 600 and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400 and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3.

In cases where silica is included in the tread compound, a silica coupling agent will also normally be included in the blend to fully realize the total benefit of including silica in the blend. The silica coupling agent will typically be a sulfur containing organosilicon compound. Examples of suitable sulfur-containing organosilicon compounds are of the formula:

in which Z is selected from the group consisting of

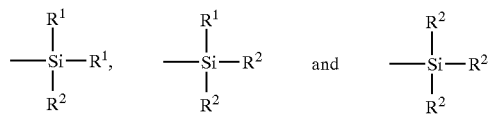

where $R^1$ is an alkyl group of 1 to 4 carbon atoms, cyclohexyl or phenyl; wherein $R^2$ is alkoxy of 1 to 8 carbon atoms or cycloalkoxy of 5 to 8 carbon atoms; and wherein Alk is a divalent hydrocarbon of 1 to 18 carbon atoms and n is an integer of 2 to 8.

Specific examples of sulfur-containing organosilicon compounds which may be used in accordance with the present invention include: 3,3'-bis(trimethoxysilylpropyl) disulfide, 3,3'-bis(triethoxysilylpropyl) tetrasulfide, 3,3'-bis (triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2' -bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis (methyl ethoxypropoxysilylethyl) tetrasulfide, 3,3'-bis (diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilylocta-decyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis (dimethoxymethylsilylpentyl) trisulfide, 3,3'-bis(trimethoxysilyl-2-methylpropyl) tetrasulfide and 3,3'-bis(dimethoxyphenylsilyl-2-methylpropyl) disulfide.

Some preferred sulfur-containing organosilicon compounds include 3,3'-bis(trimethoxy or triethoxy silylpropyl) sulfides. A highly preferred compound is 3,3'-bis(triethoxysilylpropyl) tetrasulfide. Therefore, as to Formula I, preferably Z is

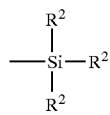

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred. Another highly preferred class of sulfur-containing organosilicon compounds are the 3,3'-bis(trimethoxy or triethoxy silyl propyl) polysulfides; such as, 3,3'-bis(triethoxysilylpropyl) polysulfide.

The amount of the sulfur containing organosilicon compound of Formula I in a rubber composition will vary, depending on the level of silica that is used. Generally speaking, the amount of the compound of Formula I will range from about 0.01 to about 1.0 parts by weight per part by weight of the silica. Preferably, the amount will range from about 0.02 to about 0.4 parts by weight per part by weight of the silica. More preferably, the amount of the compound of Formula I will range from about 0.05 to about 0.25 parts by weight per part by weight of the silica. It is to be appreciated that the silica coupler may be used in conjunction with carbon black; namely, premixed with carbon black prior to addition to the rubber composition, and such carbon black is to be included in the aforesaid amount of carbon black for the rubber composition formulation.

In cases where the tire tread rubber formulation includes silica and a silica coupling agent, it will typically be mixed utilizing a thermomechanical mixing technique. The mixing of the tire tread rubber formulation can be accomplished by methods known to those having skill in the rubber mixing art. For example, the ingredients are typically mixed in at least two stages; namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber, silica and sulfur containing organosilicon, and carbon black, if used, are mixed in one or more non-productive mix stages. The terms "non-productive" and "productive" mix stages are well known to those having skill in the rubber mixing art.

The sulfur-vulcanizable rubber composition containing the sulfur containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

The tire tread rubber formulations of this invention can be used in tire treads in conjunction with ordinary tire manufacturing techniques. Tires are built utilizing standard procedures with the tread compound of this invention simply being substituted for the rubber compounds typically used as the tread rubber. After the tire has been built with the tread compound of this invention, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 14 minutes with a cure cycle of about 12 minutes being most preferred.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

In this experiment, a tire tread rubber compound was made in accordance with this invention and compared to a control made with a conventional carbon black. The tire tread formulations made and the processing characteristics thereof are summarized in Table I. The high structure carbon black used in Example 1 had a DBP of 171 and a CTAB of 80. The conventional carbon black used in the control had a DBP of 124 and a CTAB of 104. The hydrated silica used in these examples was of a fine particle size and had a specific gravity of 2.0. With respect to the Tuber Tread Die Extrudate Ratings given in Table I, smooth is designated as 1 and rough is designated as 10.

TABLE I

|  | Ex. 1 | Control |
| --- | --- | --- |
| Budene ® 1208 Polybutadiene | 85 | 85 |
| High Vinyl 3,4-Polyisoprene | 15 | 15 |
| Conventional Carbon Black | — | 38 |
| High Structure Carbon Black | 45 | — |
| Processing Oil | 8.5 | 8.5 |
| Hydrated Silica | 12 | 12 |
| Tuber Tread Die Rating (Outer Edge) | 2 | 8 |

TABLE I-continued

|  | Ex. 1 | Control |
|---|---|---|
| Tuber Tread Die Rating (Inner Edge) | 3 | 7 |
| Tuber Tread Die Rating (Surface) | 3 | 7 |
| tan delta @ 100° C. & 11 Hz - 7% | 0.132 | 0.129 |
| Tan Delta @ 100° C. & 11 Hz - 10% | 0.136 | 0.131 |
| G' 1% | 2869 | 2332 |

As can be seen from Table I, the tire tread compound made with the high structure carbon black extruded much better than did the control made using conventional carbon black. It should also be noted that rebound was improved by 2–3 points over the control compound.

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; wherein the tread is comprised of (a) about 60 phr to about 90 phr of a cis-1,4-polybutadiene rubber, wherein the cis-1,4-polybutadiene rubber has a glass transition temperature which is within the range of about −104° C. to about −80° C., (b) about 10 phr to about 40 phr of at least one additional rubbery polymer selected from the group consisting of polyisoprene rubber, polybutadiene rubber, isoprene-butadiene rubber, and styrene-isoprene-butadiene rubber, wherein the additional rubbery polymer has a glass transition temperature which is within the range of about −30° C. to about −10° C., and (c) about 20 phr to about 60 phr of carbon black, wherein the carbon black has a dibutylphthalate absorption value of at least 140 $cm^3$/100 grams and wherein the carbon black has a cetyl trimethyl ammonium bromide adsorption area which is within the range of about 60 to about 90.

2. A pneumatic tire as specified in claim 1 wherein the tread is further comprised of silica.

3. A pneumatic tire as specified in claim 2 wherein the tread is further comprised of a processing oil.

4. A pneumatic tire as specified in claim 3 wherein the processing oil is present at a level which is within the range of about 2 phr to about 18 phr.

5. A pneumatic tire as specified in claim 3 wherein the carbon black has a dibutylphthalate absorption value of at least 150 $cm^3$/100 grams.

6. A pneumatic tire as specified in claim 5 wherein the cis-1,4-polybutadiene rubber is present at a level within the range of about 70 phr to about 90 phr, and wherein the additional rubbery polymer is present at a level which is within the range of about 10 phr to about 30 phr.

7. A pneumatic tire as specified in claim 5 wherein the carbon black has a cetyl trimethyl ammonium bromide absorption area which is within the range of 70 to 85.

8. A pneumatic tire as specified in claim 7 wherein the carbon black is present at a level within the range of about 30 phr to about 55 phr.

9. A pneumatic tire as specified in claim 8 wherein the carbon black has a dibutylphthalate absorption value of at least 160 $cm^3$/100 grams.

10. A pneumatic tire as specified in claim 9 wherein the cis-1,4-polybutadiene rubber is present at a level within the range of about 80 phr to about 90 phr, and wherein the additional rubbery polymer is present at a level which is within the range of about 10 phr to about 20 phr.

11. A pneumatic tire as specified in claim 10 wherein the carbon black is present at a level within the range of about 40 phr to about 50 phr.

12. A pneumatic tire as specified in claim 4 wherein the additional rubbery polymer is a synthetic polyisoprene rubber.

13. A pneumatic tire as specified in claim 9 wherein the additional rubbery polymer is a synthetic polyisoprene rubber.

14. A pneumatic tire as specified in claim 4 wherein the additional rubbery polymer is a polybutadiene rubber.

15. A pneumatic tire as specified in claim 9 wherein the additional rubbery polymer is a polybutadiene rubber.

16. A pneumatic tire as specified in claim 4 wherein the additional rubbery polymer is a styrene-isoprene-butadiene rubber.

17. A pneumatic tire as specified in claim 9 wherein the additional rubbery polymer is a styrene-isoprene-butadiene rubber.

* * * * *